UNITED STATES PATENT OFFICE.

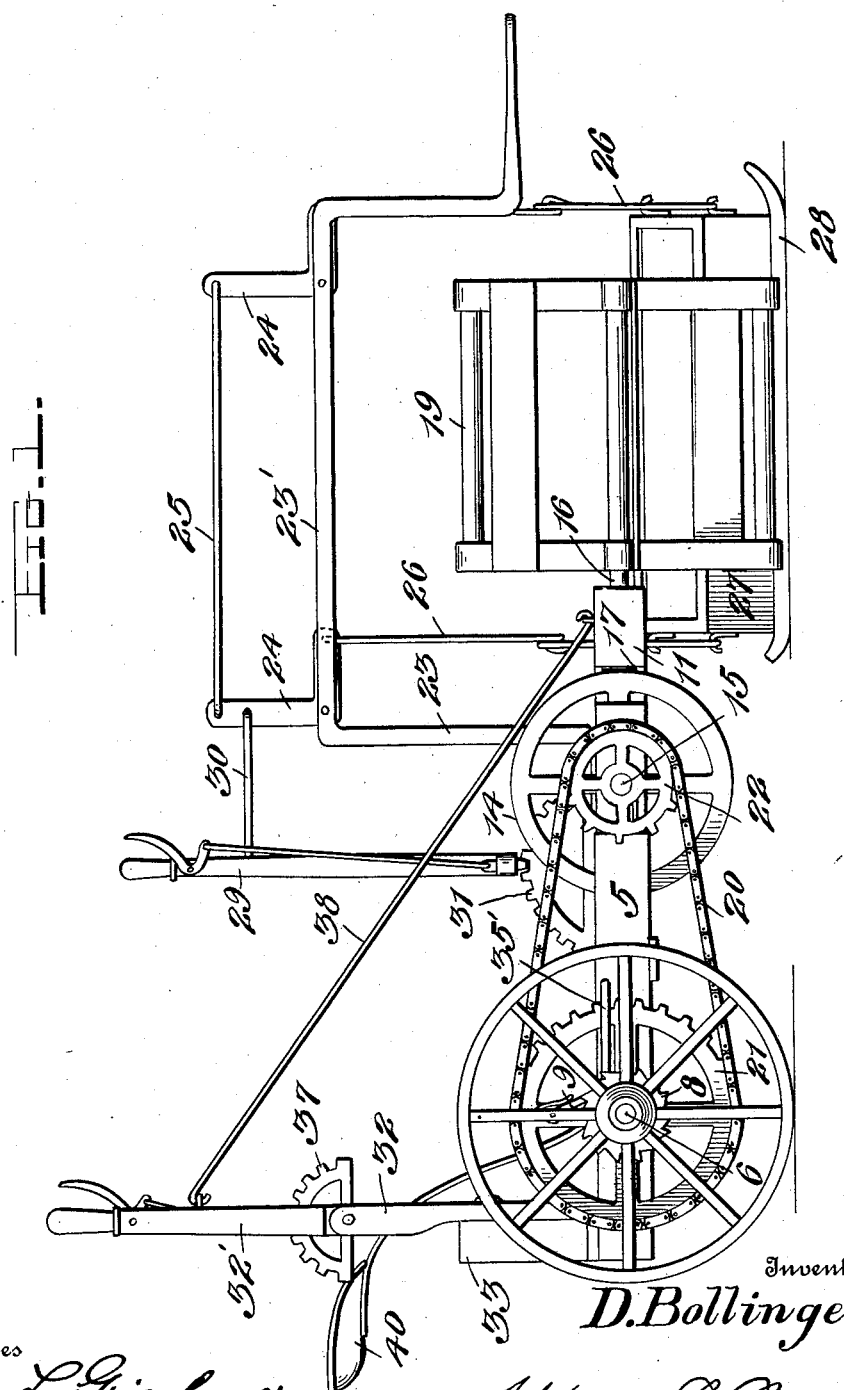

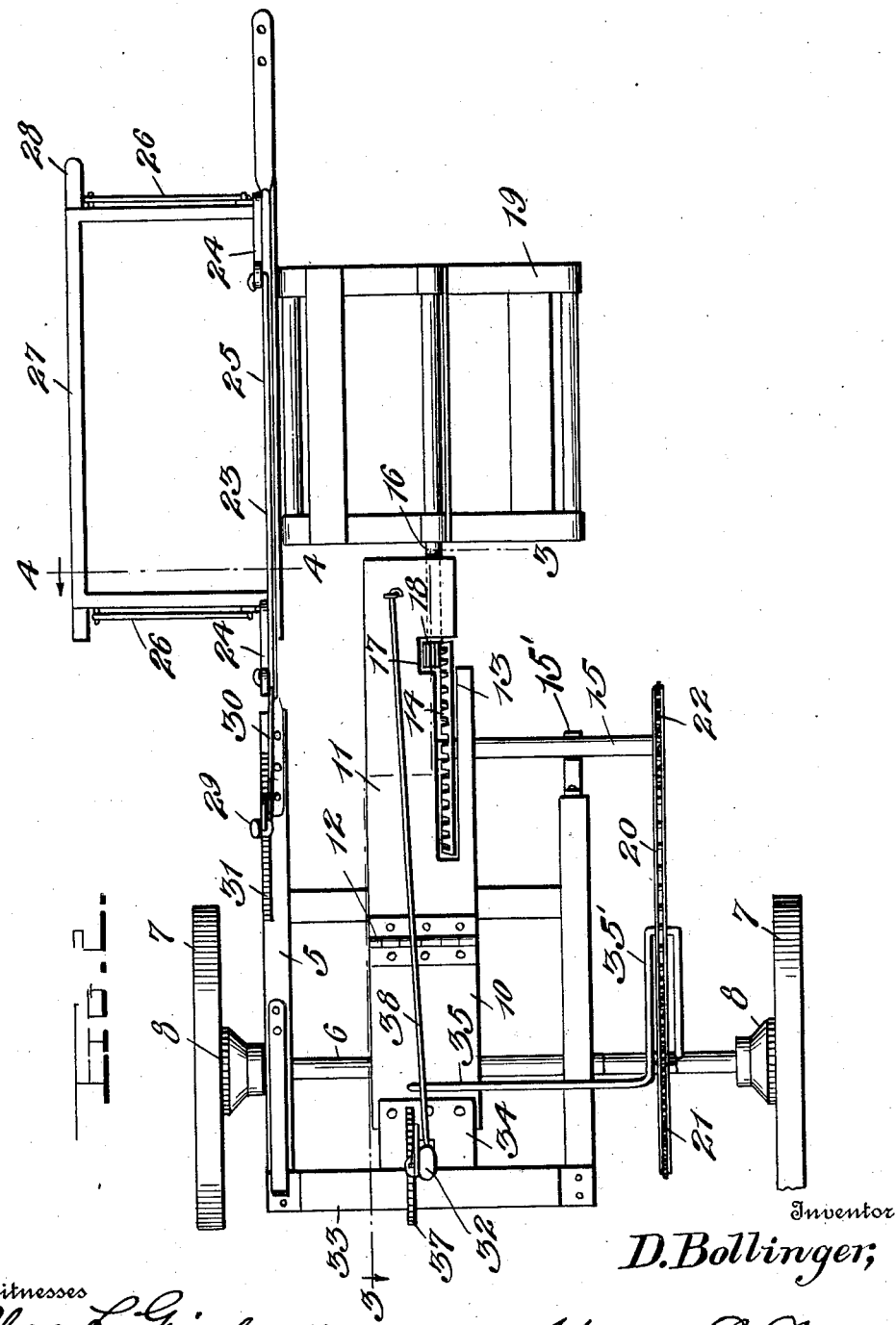

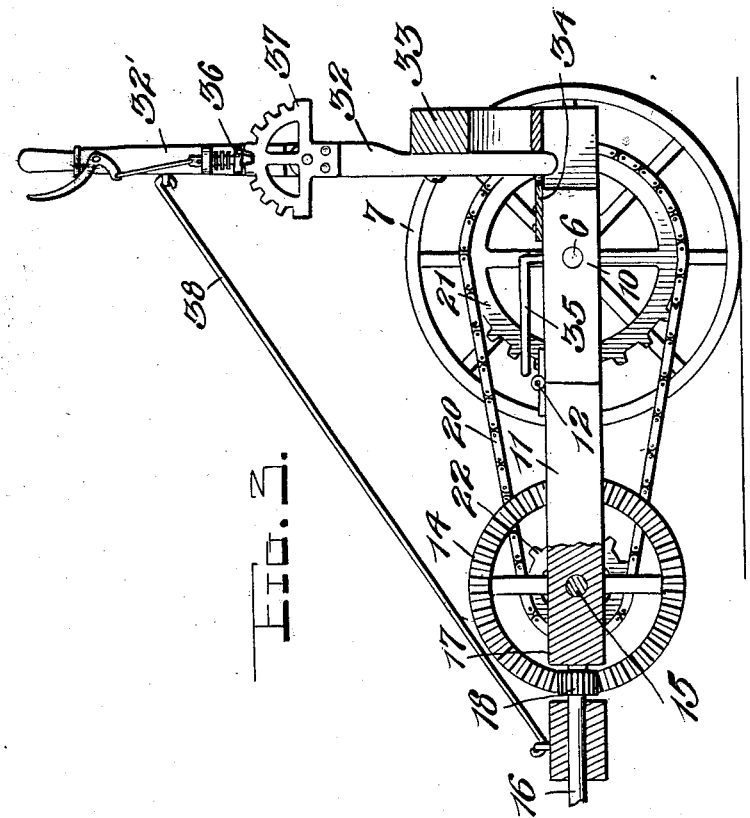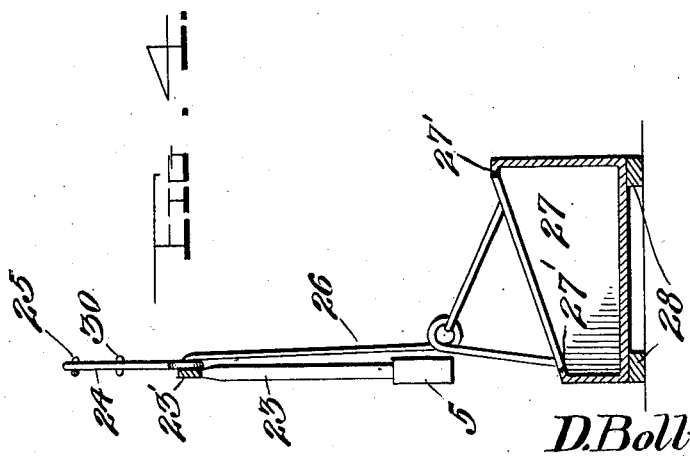

DANIEL BOLLINGER, OF CANDO, NORTH DAKOTA.

INSECT-DESTROYING MACHINE.

1,010,578. Specification of Letters Patent. Patented Dec. 5, 1911.

Application filed May 6, 1911. Serial No. 625,466.

*To all whom it may concern:*

Be it known that I, DANIEL BOLLINGER, a citizen of the United States, residing at Cando, in the county of Towner and State of North Dakota, have invented certain new and useful Improvements in Insect-Destroying Machines, of which the following is a specification, reference being had to the accompanying drawings.

This invention relates to insect destroying machines and has for its object to provide a machine for this purpose whereby potato bugs and insects may be removed from vegetation and destroyed in the movement of the machine across the field.

Another object of the invention resides in the provision of new and novel means for adjusting the revolving reel which dislodges the insects, to position the same properly with relation to the plants and the box or receptacle into which the insects are directed.

Still another object of the invention is to provide a machine which is simple economical in construction and which may be operated with a minimum amount of labor by the operator.

With the above and other objects in view, the invention consists of the novel features of construction, combination and arrangement of parts hereinafter fully described and claimed, and illustrated in the accompanying drawings, in which—

Figure 1 is a side elevation of a machine embodying my improvements; Fig. 2 is a top plan view thereof; Fig. 3 is a section taken on the line 3—3 of Fig. 2; and Fig. 4 is a section taken on the line 4—4 of Fig. 2.

Referring in detail to the drawings 5 designates the frame of the machine which is mounted upon the wheel supporting axle 6. Upon each end of this axle a ground wheel 7 is loosely mounted. These wheels are adapted to be locked upon the axle to rotate the same in one direction by means of the ratchets 8 which are fixed upon the axle 6 and with which the pawls 9 arranged upon the inner faces of the ground wheels, are adapted to engage. In the forward movement of the machine, the pawls engage with the ratchets to lock the wheels on the axle to rotate said axle and provide necessary power for the operation of an insect gathering reel as will now be described in detail.

A block 10 is mounted upon the axle 6 for sliding movement between opposite sides of the frame 5. To this block one end of a bar 11 is hinged as indicated at 12, said bar extending forwardly. This bar is provided with a longitudinal slot 13 to receive a crown gear wheel 14 fixed upon the end of an arbor 15 which is mounted in said bar. Said arbor is also supported by means of a bracket 15' which is provided with a semi-circular recess or seat to receive said arbor. One end of the reel shaft 16 is rotatably mounted in the end of the bar 11 said bar being also provided with a transverse recess 17 in which the pinion 18 fixed upon the end of the reel shaft is disposed. A reel 19 of suitable construction is arranged on the shaft 16 and is adapted to engage the vines or other plants to disengage the insects therefrom. Power is transmitted to the reel shaft through the medium of the crown gear 14 and the pinion 15, by means of the sprocket chain 20 which traverses a large sprocket wheel 21 slidably mounted upon a squared portion of the wheel axle 6, and a smaller sprocket 22 fixed upon the arbor 15.

Upon one of the side bars of the frame 5 the end of a forwardly extending rod 23 is secured. This rod is provided with a U-shaped portion 23' intermediate of its ends upon which the bell crank levers 24 are mounted. These levers are connected for simultaneous movement by means of a rod 25 and rods 26 also connect the insect receiving box or receptacle 27 to said levers. This insect receiving box is provided with the inwardly extending inclined flanges 27' to prevent the insects crawling out of the same after they have been directed therein by the reel 19. The box may contain a suitable poisonous fluid so as to immediately kill the insects. This insect box is preferably mounted upon runners 28 which move over the ground in the forward movement of the machine. The box 27 is also adjustable to position the same with respect to the reel 19. This adjusting means consists of a lever 29 which is mounted upon one side of the machine frame 5 and is connected to one of the bell cranks 24 by means of a rod 30. A rack 31 is mounted upon the frame to be engaged by the usual spring controlled dog carried by the lever to hold said lever against movement and support the insect receiving box in its adjusted position.

In order to properly position the reel 19 with relation to the height of the plants which may be attained at different stages of their growth, I provide a lever 32 which is mounted upon a bar 33 fixed to the rear end of the frame 5. This lever is pivoted upon said bar for transverse movement and its lower end is disposed in a notch provided in a plate 34 fixed upon the sliding block 10. A rod 35 has one of its ends fixed in the block 10 and extends transversely therefrom, said rod being formed with a yoke portion 35′ which receives the large sprocket wheel 21 arranged upon the wheel axle 6. It will thus be seen that when the lever 32 is moved transversely, the block 10 and consequently the bar 11 and reel 19 together with the power transmitting elements will be moved transversely whereby the reel is disposed in close relation to the plants so as to engage the leaves thereof as it rotates and directs the insects from the plants into the receiving box or receptacle 27. In order to also adjust the reel 19 vertically, the lever 32 is formed in two sections, the upper section 32′ being pivotally connected to the lower section and carrying a spring pressed dog 36 for engagement with the teeth of a rack plate 37. A rod 38 connects the lever section 32′ with the forward end of the hingedly mounted bar 11. It will be observed that when the lever section 32′ is moved forwardly or rearwardly upon its pivot, the bar 11 will be moved vertically and the reel 19 which is carried by said bar will thus be positioned properly in accordance with the height of the plants. A driver's seat 40 is suitably mounted upon the machine frame 5 adjacent to the adjusting lever 32 and upon the forwardly extending end portion of the rod 23, suitable draft attachments are arranged to which the horses or other draft animals are adapted to be connected.

From the foregoing it is believed that the construction and operation of my improved insect gathering and destroying machine will be readily understood. The machine is comparatively simple in its construction and owing to the fact that the parts thereof are readily adjustable, it may be utilized at any period in the growth of the plants. Thus the destruction of the young plants by the depredations of the insects is to a great extent overcome. The machine may be operated at very small expense and with a minimum amount of manual labor. The machine may also be inexpensively constructed and is extremely durable and efficient in practical use.

While I have above described the preferred form and construction of the various parts, it will be understood that the invention is susceptible of a great many minor modifications without departing from the essential feature or sacrificing any of the advantages thereof.

Having thus described the invention what is claimed is:—

In a machine of the character described, the combination with a frame mounted upon a wheel supported axle, of a block longitudinally movable on the axle, a bar hinged to said block, a reel including a shaft rotatably mounted in the end of the bar, a pinion on said shaft, a crown gear mounted in the bar meshing with said pinion, a sprocket on the wheel axle, a sprocket on the gear shaft, a driving chain connecting said sprockets, a yoke secured to said block extending upon opposite sides of the sprocket on said axle, a pivotally mounted transversely movable lever, the transverse movement of said lever sliding said block upon the wheel axle to move the reel and transmission means transversely, means for independently moving said hinged bar to adjust the reel vertically, and an insect receiving receptacle arranged adjacent to said reel.

In testimony whereof I hereunto affix my signature in the presence of two witnesses.

DANIEL BOLLINGER.

Witnesses:
C. E. GOODSELL,
JESSE BOLLINGER.

---

Copies of this patent may be obtained for five cents each, by addressing the "Commissioner of Patents, Washington, D. C."